United States Patent [19]

Mascola

[11] Patent Number: 5,713,609
[45] Date of Patent: Feb. 3, 1998

[54] ROTARY UNION APPARATUS

[75] Inventor: James V. Mascola, Emporia, Kans.

[73] Assignee: Vektek, Inc., Emporia, Kans.

[21] Appl. No.: 757,163

[22] Filed: Nov. 27, 1996

[51] Int. Cl.$^6$ ................................................. F16L 35/00
[52] U.S. Cl. .................. 285/18; 285/121.3; 285/190; 285/276; 285/281; 285/906; 285/18
[58] Field of Search .................................... 285/134, 136, 285/190, 98, 121.3, 276, 281, 906

[56] References Cited

U.S. PATENT DOCUMENTS

| | | | |
|---|---|---|---|
| 2,790,426 | 4/1957 | Mueller | 285/190 X |
| 3,477,746 | 11/1969 | Watson | 285/190 X |
| 3,981,329 | 9/1976 | Wohlwend | 285/136 X |
| 4,065,159 | 12/1977 | Leroy et al. | 285/190 X |
| 4,174,127 | 11/1979 | Corn et al. | 285/190 |
| 5,462,083 | 10/1995 | Kaspar | 285/136 X |

*Primary Examiner*—Dave W. Arola
*Attorney, Agent, or Firm*—Hovey, Williams, Timmons & Collins

[57] ABSTRACT

A self-cleaning rotary union apparatus provides a fluid coupling between a pair of relatively rotatable fixture elements, and includes a base and a body that are rotatable relative to one another. The base includes a mounting surface, an interior surface opposing the mounting surface, a fluid passageway extending into the base, and a plurality of bores extending through the base between the mounting surface and the interior surface. The bores are countersunk adjacent the interior surface to permit flange mounting of the base on one of the fixture elements. An elongated rotor protrudes from the interior surface of the base and includes a cylindrical side surface provided with an annular channel and a fluid passageway that communicates with the annular channel and with the passageway in the base. The body also presents mounting and interior surfaces, and includes a fluid passageway extending into the body and communicating with the annular channel of the rotor, and an outer side surface extending between the mounting and interior surfaces. The outer side surface is shaped to expose the bores at the interior surface of the base during relative rotation between the body and base in order to permit flange mounting of the base. By providing such a construction, the passageways in the base and body are maintained in fluid communication with one another by the passageway and channel of the rotor during relative rotation of the base and body.

20 Claims, 3 Drawing Sheets

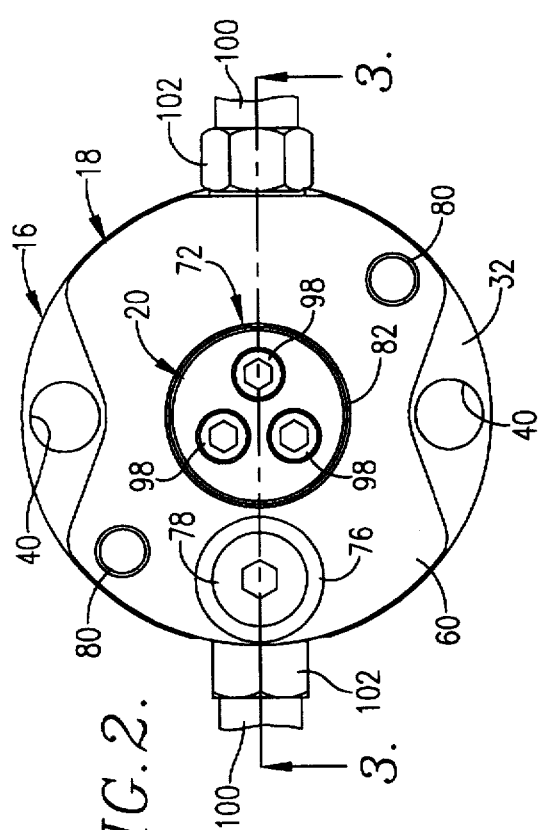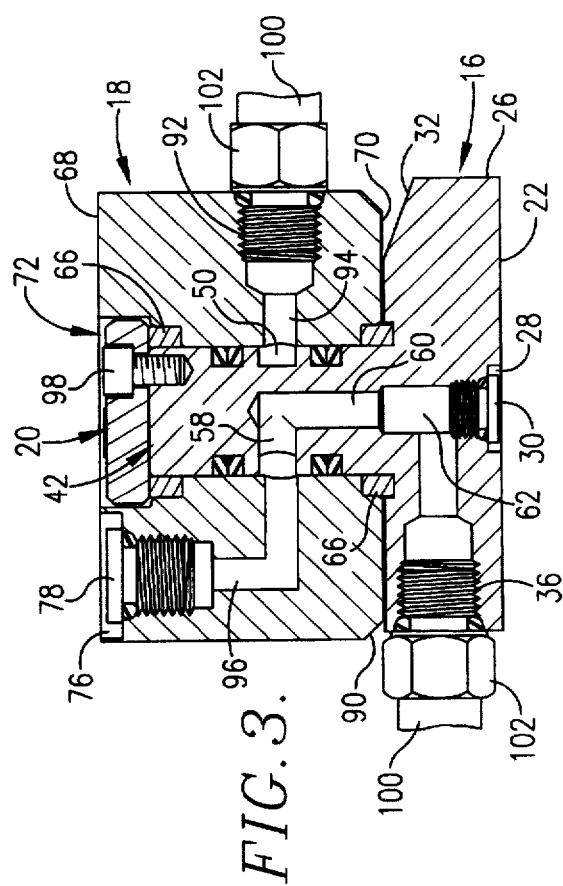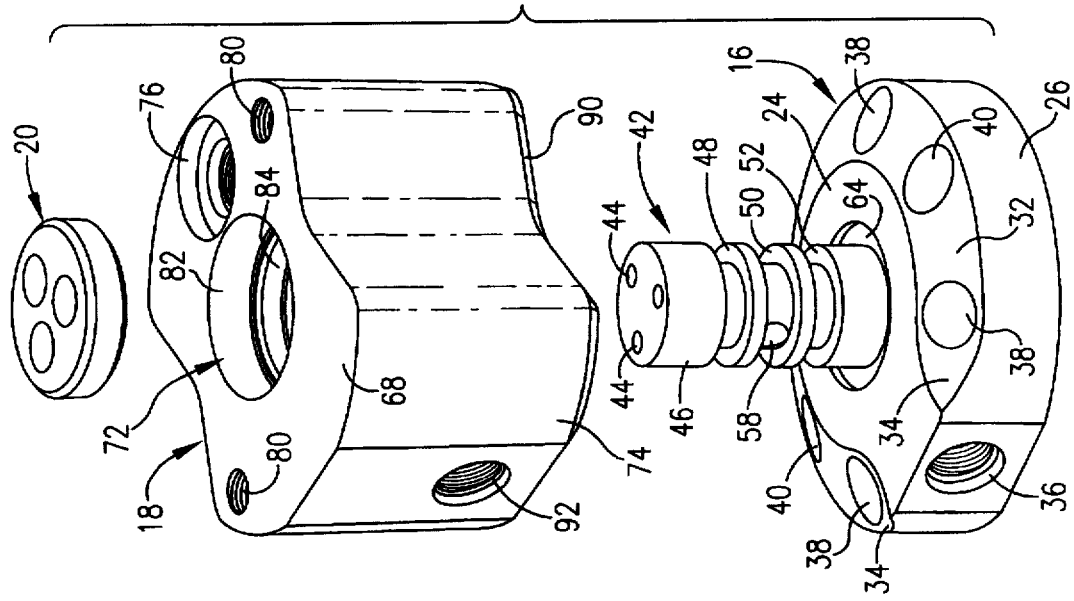

ROTARY UNION APPARATUS

BACKGROUND OF THE INVENTION

1. Field of the Invention

The present invention relates generally to fluid couplings, and more particularly to a rotary union apparatus for providing fluid communication between a pair of relatively rotatable fixture elements.

2. Discussion of the Prior Art

The use of tombstone work support fixtures in the manufacture of machined articles enables such articles to be supported during one or more machining operations. A typical tombstone fixture includes a fixed base element that is supported either on the floor or on a machine frame, and a tombstone element that is supported on the base element for relative rotation. The tombstone element includes one or more work support plates on which the articles are supported during machining, and a plurality of hydraulic swing clamps, edge clamps, retract clamps or other known hold-down devices for holding the article in place on the tombstone element during machining.

In order to supply hydraulic fluid under pressure to the hold-down devices on the tombstone fixture element, rotary union or coupling apparatuses are provided. A conventional rotary union apparatus includes a base that is secured to one of the fixture elements and a body secured to the other fixture element. The base and body each include a mounting surface by which they are secured to the fixture elements, and an interior surface opposing the mounting surface. Ports are provided in the sides of the base and body and communicate with fluid passageways extending into the base and body. A rotor is supported on the base and received in the body, defining the rotational axis of the body relative to the base. A fluid passageway extends through the rotor and provides fluid communication between the passageways in the base and body during relative rotation therebetween.

Numerous problems exist with conventional rotary union apparatuses that limit their utility in tombstone fixtures and the like. For example, because most such rotary union apparatuses are constructed primarily for use in other environments, such as in heavy machinery and the like, they are cumbersome to use and difficult to mount on a typical fixture. In addition, conventional constructions typically include only one means for mounting the apparatus to a fixture, limiting the versatility of such constructions. Likewise, such known constructions fail to provide a means for permitting manifold mounting of the rotary union apparatus on the fixture, again restricting the options for mounting and plumbing the apparatus.

A particular problem experienced in the use of rotary union apparatuses on tombstone fixtures and the like arises due to the production of chips of waste material by machine tools operating on articles supported on the fixture. Such waste commonly falls onto the rotary union apparatus and has a tendency to stick to hydraulic fluid and the like that has leaked from the apparatus between the interior surfaces of the base and body. As such, increased friction is generated between the base and body, generating unwanted heat and ultimately causing failure of the apparatus.

OBJECTS AND SUMMARY OF THE INVENTION

It is an object of the present invention to provide a rotary union apparatus that can be mounted in any of several different ways to the elements of a tombstone fixture or the like in order to facilitate the use of the apparatus on fixtures of varying constructions.

It is another object of the present invention to provide a rotary union apparatus having mounting surfaces in which fluid ports are provided such that manifold mounting of the apparatus is possible.

Yet another object of the present invention is to provide a rotary union apparatus having a base and body configured to be self-cleaning such that chips of waste material are cleared from between the base and body during relative rotation therebetween.

In accordance with these and other objects evident from the following description of a preferred embodiment of the invention, a rotary union apparatus is provided which includes a base, a rotor, and a body. The base includes a mounting surface, an interior surface opposing the mounting surface, a fluid passageway extending into the base, and a plurality of bores extending through the base between the mounting surface and the interior surface. The bores are countersunk adjacent the interior surface to permit flange mounting of the base on one of the fixture elements.

The rotor protrudes from the interior surface of the base and includes a cylindrical side surface provided with an annular channel, and a fluid passageway that communicates with the annular channel and with the passageway in the base. The body presents a mounting surface, an interior surface facing the interior surface of the base, a fluid passageway extending into the body and communicating with the annular channel of the rotor, and an outer side surface extending between the mounting and interior surfaces. The outer side surface of the body is shaped to expose the bores at the interior surface of the base during relative rotation between the body and base in order to permit flange mounting of the base. A bearing means is provided for supporting the body on the rotor for rotation about the longitudinal axis, and the passageways in the base and body are maintained in fluid communication with one another by the passageway and channel of the rotor during relative rotation of the base and body.

By providing a rotary union apparatus in accordance with the present invention, numerous advantages are realized. For example, by providing a construction which permits flange-mounting of the base, a plurality of mounting options exists which are not possible in the use of conventional constructions.

In accordance with another aspect of the invention, ports are provided in the mounting surfaces of the base and body of the rotary union apparatus in order to permit manifold-mounting of the apparatus on a fixture. The use of such manifold mounting permits hydraulic fluid to be supplied through manifolds in the fixture that are aligned in fluid communication with the passageways in the rotary union apparatus, obviating the need for external hydraulic hoses and the like. Thus, it is possible to mount the base and body of the apparatus within recesses of the fixture such that the interior surfaces of the base and body are flush with the mounting surfaces of the fixture. The resulting construction is free of external hoses and presents a clean appearance that is not possible with conventional constructions.

Preferably, the interior surface of the base is tapered along a portion of the circumference thereof to define an arcuate shelf presenting circumferential ends, and the body presents a mounting surface having an hourglass shape. As such, the interior surface of the body presents a circumferential edge that sweeps chips of waste along and radially outward of the shelf during relative rotation of the body to clear chips from

3 between the base and body. This self-cleaning construction prevents waste from collecting between the base and body, prolonging the useful life of the apparatus.

BRIEF DESCRIPTION OF THE FIGURES

The preferred embodiment of the present invention is described in detail below with reference to the attached drawing figures, wherein:

FIG. 1 is an exploded perspective view of a single-path rotary union apparatus constructed in accordance with the preferred embodiment, illustrating a base and body forming a part of the apparatus;

FIG. 2 is a top plan view of the single-path rotary union apparatus, illustrating the body in a first rotational position relative to the base;

FIG. 3 is a sectional view of the apparatus taken along line 3—3 of FIG. 2;

DETAILED DESCRIPTION OF THE PREFERRED EMBODIMENT

Figure 5:
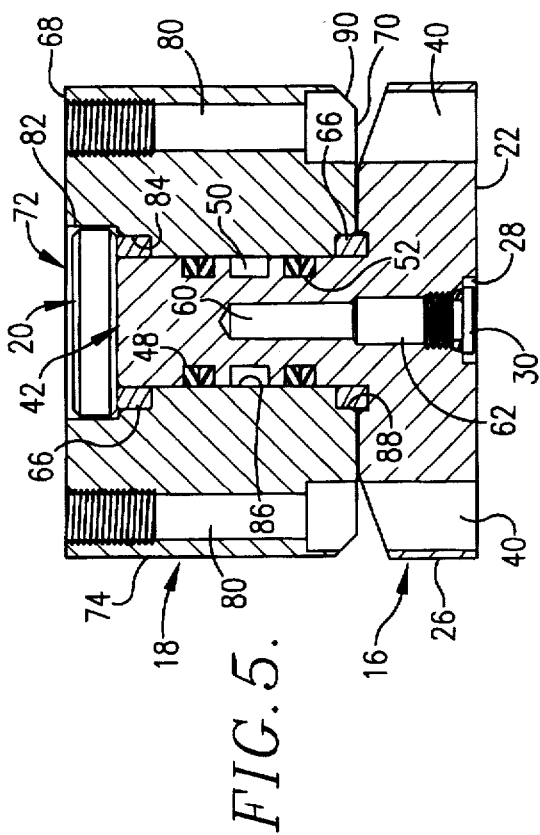
FIG. 5 is a sectional view of the apparatus taken along line 5—5 of FIG. 4.

A single-path rotary union apparatus constructed in accordance with the preferred embodiment is shown in FIG. 1, and broadly includes a base 16, a body 18 and an end plate 20, each formed of any suitable material such as steel or the like.

The base 16 is generally cylindrical in shape, presenting a lower mounting surface 22, shown in FIG. 3, by which the base is adapted for mounting to a conventional fixture element, and an opposed upper interior surface 24, shown in FIG. 1. The mounting and interior surfaces are generally circular, and are connected together by a generally cylindrical side surface 26. Returning to FIG. 3, the mounting surface is a planer surface in which a threaded port 28 is formed. The port is countersunk to receive a plug 30 when the port is not in use.

As shown in FIG. 1, the interior surface 24 of the base 16 is also generally planer, but includes an arcuate shelf 32 along which it is tapered toward the side surface of the base. The arcuate shelf extends circumferentially along a portion of the circumference of the base, and presents a pair of circumferential ends 34. The side surface of the base is flattened to form a planer face in the circumferential region of the base extending between the ends 34 of the shelf, and a threaded port 36 is formed in the side surface.

Figure 6:
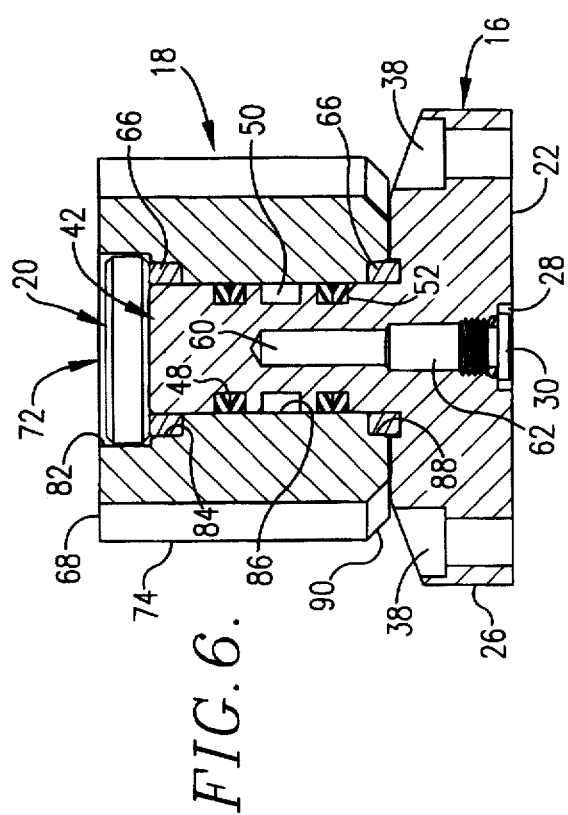
FIG. 6 is a sectional view of the apparatus taken along line 6—6 of FIG. 4.

Four bores 38 are provided in the base and extend between the mounting surface and the interior surface to define a means by which the base can be secured to a fixture element. As shown in FIG. 6, each of the bores 38 is countersunk for receipt of a threaded fastener so that the head of the fastener is received in the countersunk portion of the bore when the fastener is threaded through the bore into the fixture element to flange mount the base in place thereon. As such, the heads of the threaded fasteners do not extend above the interior surface of the base upon assembly of the apparatus.

As shown in FIG. 2, two diametrically opposed access holes 40 are provided in the base and extend between the mounting surface and the interior surface. As illustrated in FIG. 5, the access holes 40 are of a diameter large enough to provide access through the base to the body of the apparatus in a manner described more fully below to enable flange-mounting of the body to one of the fixture elements.

Returning again to FIG. 1, a rotor 42 forms a part of the base and extends from the interior surface to define a longitudinal axis about which the body is supported for rotation relative to the base. Although the rotor is illustrated as being formed from a unitary piece of material including the base, it is possible to form the rotor separately and to attach it to the base as is shown in the embodiments of FIGS. 7-14, described below.

The rotor 42 presents an upper, circular end surface into which three threaded bores 44 extend, and a cylindrical outer side surface 46 onto which the body is received. The side surface 46 includes three axially spaced annular channels 48, 50, 52. Of these, the upper and lower channels 48, 52 are each adapted to receive a rotor seal and O-ring as shown in FIG. 3, and the intermediate channel 50 includes a port 58 for providing fluid communication between the channel and an axially extending fluid passageway 60 formed in the rotor. A fluid passageway 62 is also provided in the base 16 and provides communication between the passageway 60 in the rotor and the ports 28, 36 in the base. Thus, fluid supplied to either of the ports in the base is conveyed through the passageways 62, 60 to the intermediate channel 50 of the rotor, and the rotor seals and O-rings in the upper and lower channels prevent fluid from leaking between the rotor and the body during relative rotation therebetween. As shown in FIG. 1, an annular race 64 is formed in the interior surface of the base around the rotor, and is sized for receipt of a bearing 66, shown in FIG. 3, for supporting the body on the rotor for rotation about the longitudinal axis. A second bearing 66 is supported between the body and the rotor adjacent the upper end of the rotor 42, the bearings are preferably formed of a conventional synthetic resin having a low coefficient friction for facilitating relative rotation between the body and the rotor.

With reference to FIG. 1, the body 18 is hourglass shaped, presenting an upper mounting surface 68 by which the body is adapted for mounting to a conventional fixture element, and an opposed lower interior surface 70, shown in FIG. 3. The mounting and interior surfaces are each planer and of hourglass shape, as shown in plan view in FIG. 2. Returning to FIG. 1, a central bore 72 extends through the body so that the body presents a cylindrical inner side surface and an outer side surface 74 that takes on the hourglass shape of the mounting and interior surfaces. The mounting surface includes a threaded port 76 that is countersunk to receive a plug 78, shown in FIG. 3, when the port is not in use. As shown in FIG. 5, a pair of bores 80 extend through the body between the mounting and interior surfaces for permitting the body to be secured in place on one of the fixture elements. Each bore is countersunk adjacent the interior surface of the body and includes an upper section adjacent the mounting surface that is threaded. Preferably, the minor diameter of the threaded section of each bore is equal to the diameter of the remainder of the bore.

The central bore of the body is stepped to present a large-diameter upper end region 82 within which the end plate 20 is received, an adjacent intermediate-diameter region 84 for receiving one of the bearings 66, a small diameter region 86 that is received on the rotor and engages the rotor seals and O-rings supported in the upper and lower channels of the rotor, and a lower intermediate-diameter region 88 for receiving the other bearing 66. The interior surface of the body includes an outer circumferential edge that is tapered to present a beveled shoulder 90 between the interior surface and the outer side surface of the body.

As shown in FIG. 1, the outer side surface of the body is flattened along one end of the hourglass shape to form a planer face in the circumferential region of the body opposite the port 76, and a threaded port 92 is formed in the side surface. The port 92 communicates with a fluid passageway 94 that extends through the body to a port in the inner side surface aligned with the intermediate channel 50 of the rotor. The port 76 also communicates with a fluid passageway 96 that extends through the body to a port in the inner side surface aligned with the intermediate channel 50 of the rotor. Thus, both passageways 94, 96 remain in fluid communication with the channel 50 in the rotor during rotation of the body.

The end plate 20 is circular in shape and sized for receipt within the large-diameter region of the bore 72 in the body 18. The end plate includes opposed planer end surfaces, one of which is received on the upper end surface of the rotor over the bearing 66, as shown in FIG. 3. Three holes extend through the end plate in alignment with the holes in the upper end of the rotor, and threaded fasteners 98 are provided for securing the end plate on the rotor. In this manner, the bearings 66 are held in place between the rotor and the body, and the body is secured on the rotor for relative rotational movement.

The assembled rotary union apparatus is mounted to a tombstone fixture or the like by securing the base to one of the fixture elements and the body to the other fixture element so that as the fixture elements rotate relative to one another about the longitudinal axis of the rotor, fluid communication is maintained between the ports on the base and the ports on the body. As such, fluid pressure to the rotating fixture element can be maintained during such rotational movement.

With reference to FIG. 5, in order to secure the body 18 to a fixture element, the body is first positioned on the fixture element with the mounting surface 68 flush against a support surface of the element and with the bores 80 in the body aligned with similarly oriented bores in the fixture element. Once the body is so positioned, it can be secured in place in either of two ways. First, threaded fasteners can be passed through the fixture element and threaded into the bores 80 to secure the body in place. The fasteners are sized for threaded receipt in the threaded sections of the bores so that the body is pulled against the fixture element upon tightening of the fasteners.

The second way in which the body can be secured to the fixture element includes passing threaded fasteners into the body at the interior surface and threading the fasteners into the fixture element or into a nut or the like located on the far side of the fixture element from the body. In order to gain access to the bores 80 in the body, the base is rotated to the orientation shown in FIG. 5, with the access holes 40 aligned with the bores 80. The access holes 40 have a diameter equal to that of the countersunk sunk regions of the bores, enabling the threaded fasteners to be passed through the access holes in the base and into the bores of the body.

Figure 4:
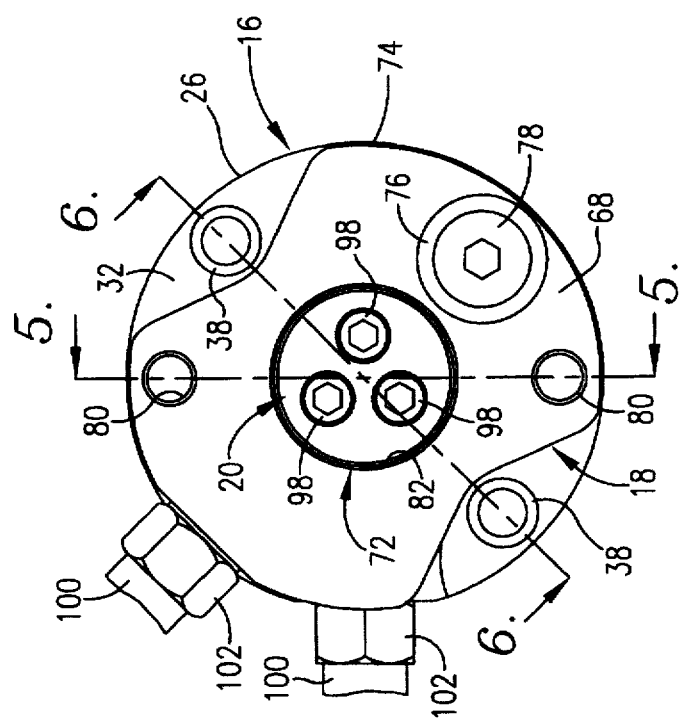
FIG. 4 is a top plan view of the single-path rotary union apparatus, illustrating the body in a second rotational position relative to the base.

Once the body is secured to the fixture element in either of the two manners described, the base 16 can be secured to the other fixture element. In order to secure the base in place, it is first positioned on the fixture element with the mounting surface flush against a support surface of the element and with the bores 38, shown in FIG. 3, in the base aligned with similarly oriented bores in the fixture element. Thereafter, threaded fasteners are passed into the base at the interior surface and threaded into the fixture element or into a nut or the like located on the far side of the fixture element from the base. In order to gain access to the bores 38 in the base, the body is rotated to the rotational position shown in FIG. 4, exposing two of the bores 38. Once fasteners have been positioned in the exposed bores, the body is rotated to expose the remaining two bores 38 so that fasteners can be applied through them. Preferably, each bore in the base is diametrically opposed to another of the bores so that when the body is rotated to expose the bores in the base, two bores are exposed at a time, each within one of the concavities of the body.

Because ports 28, 76 are provided in the mounting surfaces of the base and body, and ports 36, 92 are provided in the side surfaces thereof, it is possible to plumb the apparatus either with conventional hydraulic hoses connected to the ports in the side surfaces, or with manifold structure incorporated in the fixture to which the apparatus is mounted. When using hoses 100, the base and body are mounted flush against the fixture elements, exposing the side surfaces of the base and body for access so that the hoses can be connected to the ports through the use of conventional fittings 102. When manifold-mounting the apparatus, the base or body, or both, is secured to the respective fixture element with the port 28 or 76 in the mounting surface aligned with a port formed in the fixture element. The port in the fixture element in turn, is connected to the hydraulic circuit of the fixture through a manifold formed in the element so that hydraulic fluid under pressure is supplied to the rotary union apparatus through the manifold.

Numerous advantages are achieved through the use of manifold mounting of the rotary union apparatus. For example, by eliminating the need for hoses, it is not necessary to provide ready access to the side surfaces of the base or body. As such, the apparatus can be flush-mounted on a fixture by forming a recess in one or both fixture elements within which the base or body is received such that the interior surface of the base or body is flush with the support surface of the fixture element. This construction results in substantial space savings and eliminates the need for hoses and the usual problems associated therewith.

Once the rotary union apparatus has been mounted and plumbed, it operates to provide fluid under pressure between the fixture elements during relative rotation of the elements. The flow path that is maintained during such rotation includes the fluid passageways 62, 94, 96 in the base and body, the passageway 60 in the rotor, and the circumferential channel 50 that remains in fluid communication with both the passageway 60 and the passageways 94, 96, regardless of the rotational position of the body relative to the rotor. This flow path is the same regardless of the port used in the base or body, and is sealed against leakage through the use of the rotor seals and O-rings.

During rotation of the body relative to the base, chips of waste generated during machining operations and the like may drop onto the rotary union apparatus. However, the geometry of the body 18 and shape of the interior surface of the base 16 cooperate to shed such waste and to prevent the accumulation of chips between the base and body.

Specifically, the shoulder 90 of the interior surface of the body is hourglass-shaped, presenting a pair of diametrically opposed, arcuate edge sections that are out-turned relative to the body. In other words, the arcuate edge sections are radiused about axes that are located outside of the body and parallel to the longitudinal axis. As such, each arcuate edge section intersects the cylinder projected by the interior surface of the base at an acute angle so that chips of waste that accumulate between the base and body are swept radially outward. This sweeping action is supplemented by the shape of the interior surface of the base, wherein the circumferential ends 34 of the shelf 32 catch chips of waste material that are being swept along by the body and force it radially outward from between the base and body. As such, the base and body work together to force the chips outward away from the interior surfaces such that the apparatus is self-cleaning.

Figure 7:
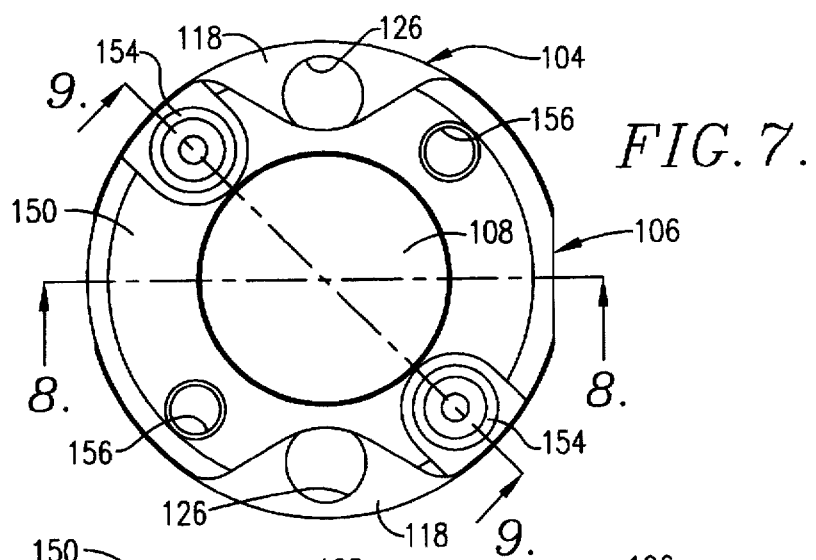
FIG. 7 is a top plan view of a dual-path rotary union apparatus constructed in accordance with the preferred embodiment.
Figure 8:
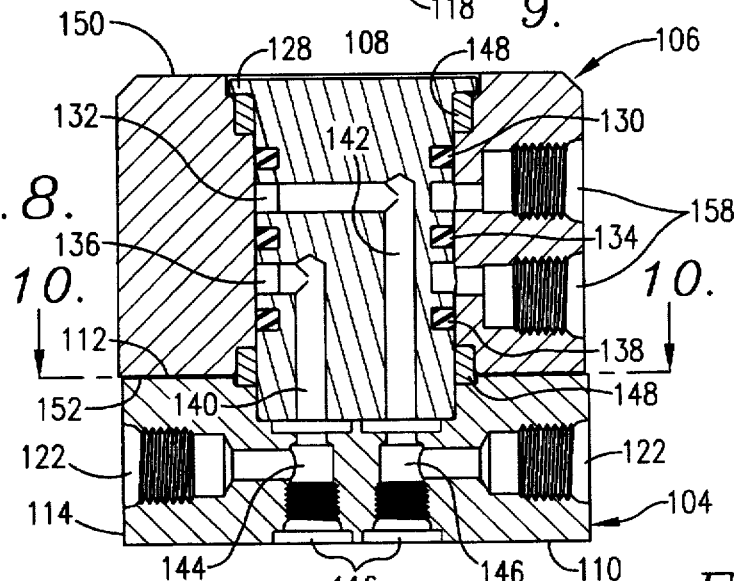
FIG. 8 is a sectional view of the apparatus taken along line 8—8 of FIG. 7.

A dual-path rotary union apparatus constructed in accordance with the preferred embodiment is shown in FIGS. 7–10, and, as illustrated in FIG. 8, broadly includes a base 104, a body 106, and a rotor 108, each formed of any suitable material such as steel or the like.

The base 104 is generally cylindrical in shape, presenting a lower mounting surface 110 by which the base is adapted for mounting to a conventional fixture element, and an opposed upper interior surface 112. The mounting and interior surfaces are generally circular, and are connected together by a generally cylindrical side surface 114. The mounting surface is a planer surface in which a pair of threaded ports 116 are formed. The ports are countersunk to receive plugs when the ports are not in use.

Figure 10:
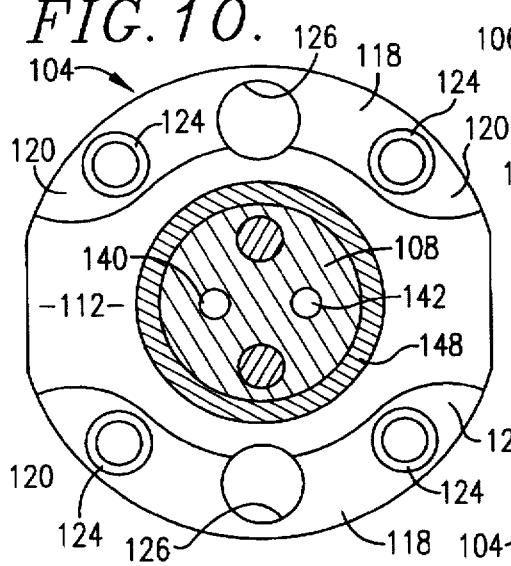
FIG. 10 is a sectional view of the apparatus taken along line 10—10 of FIG. 8.
Figure 9:
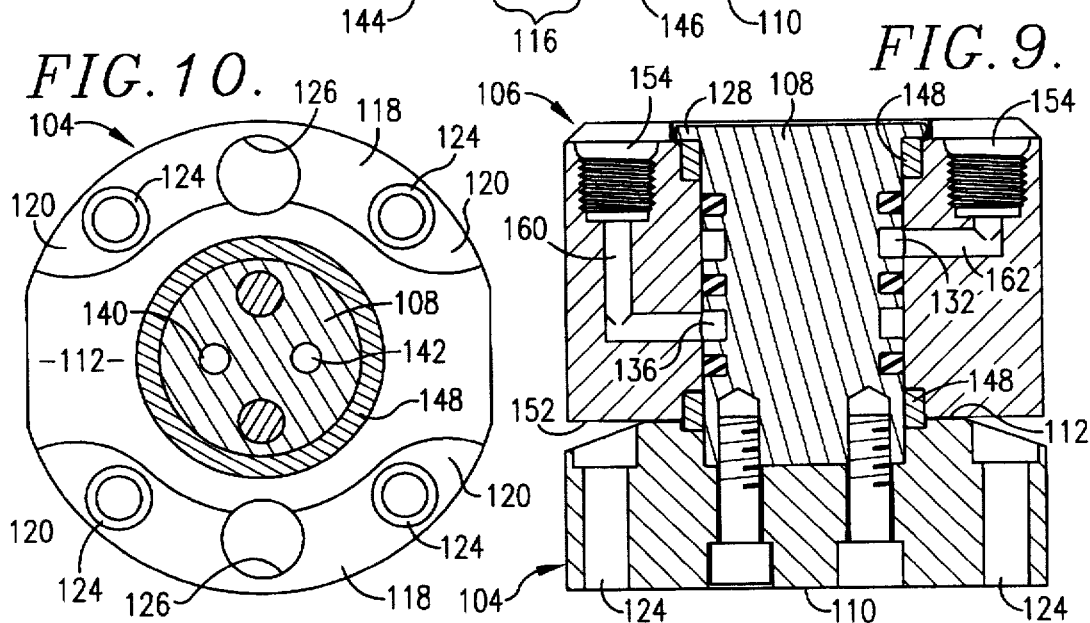
FIG. 9 is a sectional view of the apparatus taken along line 9—9 of FIG. 7.

The interior surface of the base is shown in FIG. 10, and is also generally planer, including a pair of arcuate shelves 118 along which it is tapered toward the side surface of the base. The arcuate shelves each extend circumferentially along just under half of the circumference of the base, and each shelf presents a pair of circumferential ends 120. The side surface of the base is flattened to form a pair of diametrically opposed planer faces in the circumferential regions of the base extending between the ends of each shelf, and, as shown in FIG. 8, a threaded port 122 is formed in each flattened area of the side surface. As shown in FIG. 10, four bores 124 are provided in the base and extend between the mounting surface and the interior surface to define a means by which the base can be secured to a fixture element. As shown in FIG. 9, each of the bores 124 is countersunk for receipt of a threaded fastener so that the head of the fastener is received in the countersunk portion of the bore when the fastener is threaded through the bore into the fixture element to flange mount the base in place thereon. As such, the heads of the threaded fasteners do not extend above the interior surface of the base.

Returning to FIG. 10, two diametrically opposed access holes 126 are provided in the base and extend between the mounting surface and the interior surface. The access holes are of a diameter large enough to provide access through the base to the body of the apparatus to enable flange-mounting of the body to one of the fixture elements.

As shown in FIG. 9, the rotor 108 is separate from the base and extends from the interior surface to define a longitudinal axis about which the body is supported for rotation relative to the base. Threaded fasteners are provided for securing the base and rotor together against relative movement. Although the rotor is illustrated as being formed separately from the base, it is possible to form the rotor and base of the same piece of material, as shown in the embodiment of FIGS. 1–6.

The rotor 10 presents an upper, circumferential flange 128 that defines an end plate for holding the body in place on the rotor upon assembly of the apparatus, and a cylindrical outer side surface onto which the body is received. The side surface includes five axially spaced annular channels 130, 132, 134, 136, 138. Of these, the upper, intermediate, and lower channels 130, 134, 138 are each adapted to receive a rotor seal and O-ring, and the remaining channels each include a port for providing fluid communication between the channel and one of two axially extending fluid passageways 140, 142 formed in the rotor. A pair of fluid passageways 144, 146 are also provided in the base and provide communication between the passageways in the rotor and the ports 116, 122 in the base. Thus, fluid supplied to either of the pairs of ports in the base is conveyed through the passageways to the channels 132, 136 of the rotor, and the rotor seals and O-rings in the upper, intermediate, and lower channels prevent fluid from leaking between the passageways and between the rotor and the body during relative rotation therebetween.

An annular race is formed in the interior surface of the base around the rotor, and is sized for receipt of a bearing 148 for supporting the body on the rotor for rotation about the longitudinal axis. A second bearing 148 is supported between the body and the rotor adjacent the upper end of the rotor, the bearings are preferably formed of a conventional synthetic resin having a low coefficient friction for facilitating relative rotation between the body and the rotor.

As shown in FIG. 7, the body 106 is hourglass shaped, presenting an upper mounting 150 surface by which the body is adapted for mounting to a conventional fixture element, and an opposed lower interior surface 152, shown in FIG. 9. The mounting and interior surfaces are each planer and of hourglass shape. A central bore extends through the body between the surfaces so that the body presents a cylindrical inner side surface with the bore and an outer side surface that takes on the hourglass shape of the mounting and interior surfaces. The mounting surface 150 includes a pair of threaded ports 154 that are each countersunk to receive a plug when the port is not in use. As shown in FIG. 7, a pair of bores 156 extend through the body between the mounting and interior surfaces for permitting the body to be secured in place on one of the fixture elements. Each bore 156 is countersunk adjacent the interior surface of the body and includes an upper section adjacent the mounting surface that is threaded. Preferably, the minor diameter of the threaded section of each bore is equal to the diameter of the remainder of the bore. The central bore of the body is stepped to present a large-diameter upper end region within which the flange 128 of the rotor is received, an adjacent intermediate-diameter region for receiving one of the bearings 148, a small diameter region that is received on the rotor and engages the rotor seals and O-rings supported in the channels 130, 134, 138 of the rotor, and a lower intermediate-diameter region for receiving the other bearing 148.

As shown in FIG. 7, the outer side surface of the body 106 is flattened along an end of the hourglass shape to form a planer face in the circumferential region of the body, and a pair of threaded ports 158 are formed in the flattened area of the side surface. The ports 158 each communicate with a fluid passageway that extends through the body to a port in the inner side surface aligned with the channels 132, 136 of the rotor. The ports 154 also communicate with a pair of fluid passageways 160, 162 that extend through the body to a pair of ports aligned with the channels 132, 136 of the rotor. Thus, all eight ports 116, 122, 154, 158 remain in fluid communication with one another via the channels 132, 136 in the rotor during rotation of the body.

The assembled rotary union apparatus is mounted to a tombstone fixture or the like by securing the base 104 to one of the fixture elements and the body 106 to the other fixture element so that as the fixture elements rotate relative to one another about the longitudinal axis of the rotor, fluid communication is maintained between the ports on the base and the ports on the body. As such, fluid pressure to the rotating fixture element can be maintained during such rotational movement. Mounting, plumbing and operation of the apparatus is the same as with the single-path embodiment, except that two separate fluid passageways are maintained by the apparatus during relative rotation of the base and body rather than just one. Thus, the same advantages are realized with the dual-path embodiment.

Although the present invention has been described with reference to the preferred embodiment, it is noted that equivalents may be employed and substitution made herein without departing from the scope of the invention as recited in the claims. For example, although single and dual path embodiments are shown in the figures and described herein, a rotary union apparatus can be constructed with any desired number of paths without departing from the scope of the invention.

What is claimed is:

1. A rotary union apparatus for providing a fluid coupling between a pair of relatively rotatable fixture elements, the apparatus comprising:
    a base including a mounting surface, an interior surface opposing the mounting surface, a fluid passageway extending into the base, and a plurality of bores extending through the base between the mounting surface and the interior surface, the bores being countersunk adjacent the interior surface to permit flange mounting of the base on one of the fixture elements;
    an elongated rotor protruding from the interior surface of the base and defining a longitudinal axis, the rotor including a cylindrical side surface provided with an annular channel, and a fluid passageway that communicates with the annular channel and with the passageway in the base;
    a body presenting a mounting surface, an interior surface facing the interior surface of the base, a fluid passageway extending into the body and communicating with the annular channel of the rotor, and an outer side surface extending between the mounting and interior surfaces, the outer side surface being shaped to expose the bores at the interior surface of the base during relative rotation between the body and base in order to permit flange mounting of the base;
    bearing means for supporting the body on the rotor for rotation about the longitudinal axis, the passageways in the base and body being maintained in fluid communication with one another by the passageway and channel of the rotor during relative rotation of the base and body;
    retaining means for retaining the body on the rotor; and
    sealing means for preventing fluid from leaking between the rotor and the body during relative rotation therebetween.

2. A rotary union apparatus as recited in claim 1, wherein the body includes a plurality of bores extending between the mounting surface and the interior surface, the bores being countersunk adjacent the interior surface to permit flange mounting of the base on one of the fixture elements and being threaded along at least a portion of the lengths thereof adjacent the mounting surface to permit a threaded fastener to be inserted through the fixture element and threaded into the body.

3. A rotary union apparatus as recited in claim 2, wherein the body includes an access hole extending between the mounting and interior surfaces of the base for providing access through the base to the body so that a threaded fastener can be inserted through the body to permit flange mounting of the base on one of the fixture elements.

4. A rotary union apparatus as recited in claim 1, wherein the mounting and interior surfaces of the base are generally circular in shape, and the mounting and interior surfaces of the body are non-circular in shape and define a concavity in the side surface that provides access to the bores in the base.

5. A rotary union apparatus as recited in 1, wherein the base includes a first port formed in the side surface and a second port formed in the mounting surface, the first and second ports being in fluid communication with the passageway in the base so that either port can be used to provide a fluid connection with the rotary union apparatus.

6. A rotary union apparatus as recited in claim 1, wherein the body includes a first port formed in the side surface and a second port formed in the mounting surface, the first and second ports being in fluid communication with the passageway in the body so that either port can be used to provide a fluid connection with the rotary union apparatus.

7. A rotary union apparatus as recited in claim 1, wherein the interior surface of the base is tapered toward the side surface along a portion of the circumference of the base to define an arcuate shelf presenting circumferential ends, and the interior surface of the body is of non-circular shape, presenting a circumferential edge that sweeps chips of waste along and radially outward of the shelf during relative rotation of the body to clear the chips from between the interior surfaces.

8. A rotary union apparatus as recited in claim 1, the retaining means including an end plate for holding the body in place on the rotor.

9. A rotary union apparatus as recited in claim 1, the retaining means including a circumferential flange on one end of the rotor for holding the body in place on the rotor.

10. A rotary union apparatus as recited in claim 1, the sealing means including a rotor seal and an O-ring positioned between the rotor and the body.

11. A self-cleaning rotary union apparatus for providing a fluid coupling between a pair of relatively rotatable fixture elements, wherein chips of waste are cleaned from the apparatus during relative rotation of the elements, the apparatus comprising:
    a base including a mounting surface, an interior surface opposing the mounting surface, a side surface, and a fluid passageway extending into the base, the interior surface being tapered toward the side surface along a portion of the circumference of the base to define an arcuate shelf presenting circumferential ends;
    an elongated rotor protruding from the interior surface of the base and defining a longitudinal axis, the rotor including a cylindrical side surface provided with an annular channel, and a fluid passageway that communicates with the annular channel and with the passageway in the base;
    a body presenting a mounting surface having an hourglass shape, an interior surface facing the interior surface of the base and being of the same shape as the mounting surface of the body, a fluid passageway extending into the body and communicating with the annular channel of the rotor, and an outer side surface extending between the mounting and interior surfaces of the body;

bearing means for supporting the body on the rotor for rotation about the longitudinal axis, the interior surface of the body presenting a circumferential edge that sweeps the chips of waste along and radially outward of the shelf during relative rotation of the body to clear the chips from between the interior surfaces;

retaining means for retaining the body on the rotor; and sealing means for preventing fluid from leaking between the rotor and the body during relative rotation therebetween.

12. A rotary union apparatus as recited in claim 11, the retaining means including an end plate for holding the body in place on the rotor.

13. A rotary union apparatus as recited in claim 11, the retaining means including a circumferential flange on one end of the rotor for holding the body in place on the rotor.

14. A rotary union apparatus as recited in claim 11, the sealing means including a rotor seal and an O-ring positioned between the rotor and the body.

15. A rotary union apparatus for providing a fluid coupling between first and second relatively rotatable fixture elements, wherein the first fixture element includes a manifold presenting a port, the apparatus comprising:

a base including a mounting surface, an interior surface opposing the mounting surface, and a fluid passageway extending into the base;

an elongated rotor protruding from the interior surface of the base and defining a longitudinal axis, the rotor including a cylindrical side surface provided with an annular channel, and a fluid passageway that communicates with the annular channel and with the passageway in the base;

a body presenting a mounting surface, an interior surface facing the interior surface of the base, a fluid passageway extending into the body and communicating with the annular channel of the rotor, and an outer side surface extending between the mounting and interior surfaces;

bearing means for supporting the body on the rotor for rotation about the longitudinal axis, the passageways in the base and body being maintained in fluid communication with one another by the passageway and channel of the rotor during relative rotation of the base and body;

mounting means for mounting the base and body to the fixture elements, at least one of the mounting surfaces including a port aligned with the manifold port for providing fluid communication between the first fixture element and the apparatus;

retaining means for retaining the body on the rotor; and sealing means for preventing fluid from leaking between the rotor and the body during relative rotation therebetween.

16. A rotary union apparatus as recited in claim 15, the retaining means including an end plate for holding the body in place on the rotor.

17. A rotary union apparatus as recited in claim 15, the retaining means including a circumferential flange on one end of the rotor for holding the body in place on the rotor.

18. A rotary union apparatus as recited in claim 15, the sealing means including a rotor seal and an O-ring positioned between the rotor and the body.

19. A self-cleaning rotary union apparatus for providing a fluid coupling between a pair of relatively rotatable fixture elements, the apparatus being subject to the accumulation of chips of waste thereon during use, the apparatus comprising:

a base including a mounting surface, an interior surface opposing the mounting surface, a side surface, and a fluid passageway extending into the base;

an elongated rotor protruding from the interior surface of the base and defining a longitudinal axis, the rotor including a cylindrical side surface provided with an annular channel and a fluid passageway that communicates with the annular channel and with the passageway in the base;

a body presenting a mounting surface, an interior surface facing the interior surface of the base, a fluid passageway extending into the body and communicating with the annular channel of the rotor, and an outer side surface extending between the mounting and interior surfaces of the body;

bearing means for supporting the body on the rotor for rotation about the longitudinal axis;

clearing means for clearing the chips of waste from between the base and the body during relative rotation therebetween;

retaining means for retaining the body on the rotor; and sealing means for preventing fluid from leaking between the rotor and the body during relative rotation therebetween.

20. A rotary union apparatus for providing a fluid coupling between a pair of relatively rotatable fixture elements, the apparatus comprising:

a base including a mounting surface, an interior surface opposing the mounting surface, a side surface, and a fluid passageway extending into the base;

an elongated rotor protruding from the interior surface of the base and defining a longitudinal axis, the rotor including a cylindrical side surface provided with an annular channel and a fluid passageway that communicates with the annular channel and with the passageway in the base;

a body presenting a mounting surface, an interior surface facing the interior surface of the base, a fluid passageway extending into the body and communicating with the annular channel of the rotor, and an outer side surface extending between the mounting and interior surfaces of the body;

bearing means for supporting the body on the rotor for rotation about the longitudinal axis; retaining means for retaining the body on the rotor;

sealing means for preventing fluid from leaking between the rotor and the body during relative rotation therebetween; and mounting means for permitting selective mounting of the base and the body to the fixture elements in both flange and manifold mounting configurations.

* * * * *